June 21, 1938.   I. M. COLBETH   2,121,423
TESTING DEVICE FOR WETTING AGENTS
Filed Dec. 23, 1935
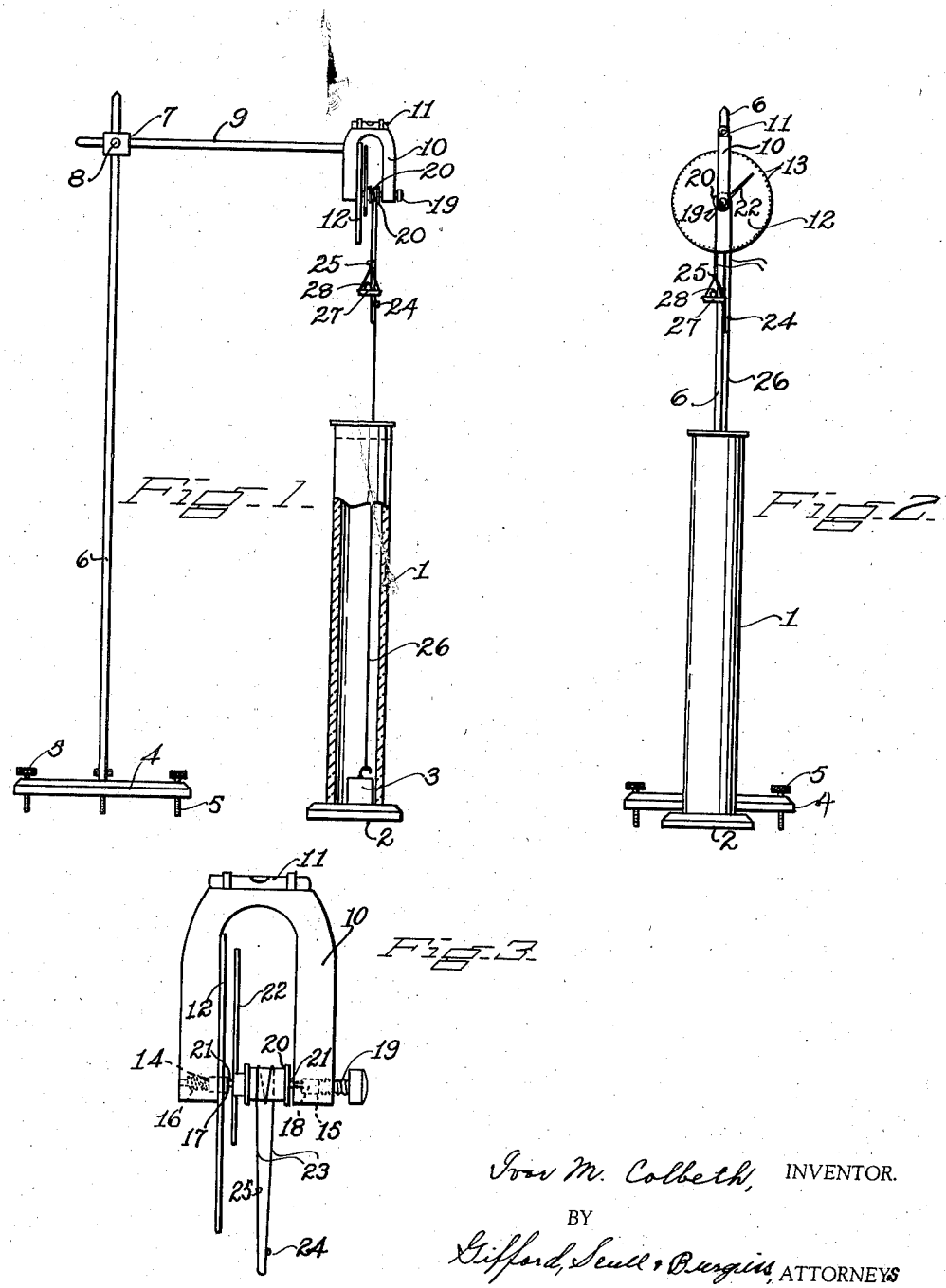
Ivan M. Colbeth, INVENTOR.
BY
Gifford, Scull & Burgess, ATTORNEYS Patented June 21, 1938

2,121,423

UNITED STATES PATENT OFFICE 2,121,423

TESTING DEVICE FOR WETTING AGENTS

Ivor M. Colbeth, East Orange, N. J., assignor to The Baker Castor Oil Company, New York, N. Y., a corporation of New Jersey Application December 23, 1935, Serial No. 55,694

2 Claims. (Cl. 73—51)

This invention relates to a device for testing the wetting power of agents which are used to increase the ability for liquids to penetrate materials such as cloth or other textile products.

It is known that some wetting agents that are used, for example to increase the rapidity with which water penetrates textile and other materials, operate to start the penetration rapidly and after a certain amount of wetting has been produced the operation slows down, while other wetting agents do not begin their effect so promptly but continue in a more uniform or different manner during the remainder of the wetting time.

By the present invention, wetting agents in liquids to cause them to penetrate the materials more rapidly can be tested in such a manner as to determine not only the initial wetting rate but also the rate at which further penetration into the interior of the material takes place. In carrying out the invention small samples of the material to be wetted can be tested rapidly and with very little—if any—waste of material.

The invention will be understood from the description in connection with the accompanying drawing, in which Fig. 1 is a side view of an illustrative embodiment of the invention with parts in section; Fig. 2 is a view at right angles to Fig. 1; and Fig. 3 is a side view on an enlarged scale of some of the parts.

In the drawing, reference character 1 indicates a tube that is preferably made of glass and is closed at the bottom, to be used as a container for a liquid containing a wetting agent. A base 2 is provided for the tube to maintain it in an upright position. A weight 3 is shown in the tube 1, resting on the bottom thereof.

A base 4 is provided with adjusting screws 5 for the purpose of leveling the same. An upright rod 6 is anchored on the base 4 and is provided with a slide 7 that can be fixed in different positions on this rod by means of the set screw 8. An arm 9 passes through the slide 8 and is firmly held in a horizontal position thereby.

A U-shaped carried 10 for bearings and other mechanism is rigidly supported at the end of the arm 9. A spirit level 11 is attached to the upper side of the carrier 10 for convenience in showing when the screws 5 are properly adjusted for leveling the device.

A disc 12 of metal or other material is attached to the inside surface of one of the legs of the U-shaped carrier 10 and graduations 13 are provided along its face near the edge thereof.

Transverse openings 14 and 15 (Fig. 3) are provided near the lower ends of the legs of the carrier 10 and are aligned with the center of the disc 12.

A coil spring 16 is mounted in the opening 14 and a bearing member 17 having a conically shaped recess in its outer end with a jewel bearing at the bottom of the recess is placed in the opening 14 against the spring 16.

A bearing member 18 corresponding to the member 17 is placed in the opening 15 and rests against the end of an adjusting screw 19 that is threaded into this opening 15 which is threaded for that purpose. A flanged roller 20 is provided with a shaft 21 fixed thereto. The ends of the shaft 21 are pointed and rest in the jewel bearings of the bearing members 17 and 18. The adjusting screw 19 is screwed up sufficiently to compress the spring 16 slightly and still cause the roller 20 to be mounted in the jewel bearings in such a way that only an exceedingly small force is required to turn this roller in its bearings.

A pointer 22 is rigidly attached to the shaft 21 or to an extension on the roller 20 and extends on opposite sides of said shaft. The outer end of this pointer moves in proximity to the graduations 13 on the disc 12.

A light endless chain or cord 23 is wrapped one or more times around the roller 20 with the remainder of this chain or cord hanging down from this roller. One side is provided with a ring 24 and the other side with a ring 25 for a purpose to be described. In this way the chain or cord 23 itself does not tend to turn the roller in either direction.

A sample 26, such as a thread of the textile material that is to be used in testing the wetting agent, has one end thereof connected to the weight 3 and the other end is connected to the ring 24. A scale pan 27 is connected to the other ring 25. Different weights 28 may be placed on it.

The operation is as follows:

The chain or cord 23 is applied to the roller 20 as shown in Fig. 3, the ends of the shaft 21 are placed in the ends of the bearing members 17 and 18 and the adjusting screw 19 is tightened sufficiently to keep the roller 20 in place, while at the same time it is very delicately mounted so as to revolve easily with the pointer 22 near the disc 12.

One end of a sample or thread of textile material 26 is attached to the weight 3 and the other end to the ring 24. The weight 3 is dropped into the container 1 and the reading of the pointer is noted. Liquid, such as water, for example, containing the wetting agent is introduced into the container 1 to a sufficient depth to immerse a predetermined length of the sample or thread 26 in the liquid. As the liquid containing the wetting agent penetrates the thread or sample 26, it will either expand or contract—depending upon the nature of the material—thus causing the roller 20 to turn in one direction or the other, carrying the pointer 22 along the scale 13. The observer notes the reading of the pointer 22 at intervals, say each five seconds, until this pointer ceases to move, thereby indicating that the liquid containing the wetting agent has completely penetrated the sample. An inspection of the readings or a curve plotted with the time and readings of the pointer 22 as coordinates will show the characteristics of the wetting agent.

Different sorts of wetting agents may be tested in different sorts of liquids, and samples of different sorts of textile materials may be used, and the container 1 may have the liquid in it before the weight 3 and sample 26 are introduced into this container.

I claim:

1. In a device for testing wetting agents, a liquid container, means for holding one end of a sample of textile material with which the wetting agent is to be tested in a fixed position in said container, means comprising a roller and an endless flexible member passing at least once around said roller for applying uniform tension to said sample while it is being wetted and means comprising a pointer associated with said roller and extending on opposite sides of the axis of said roller to indicate progressive change of length of said sample as it becomes wetted.

2. In a device for testing wetting agents, a liquid container, a weight for holding one end of a sample of textile material with which the wetting agent is to be tested in a fixed position in said container, means comprising a roller and an endless flexible member passing at least once around said roller for applying tension to said sample while it is being wetted, and means comprising a pointer associated with said roller and extending on opposite sides of the axis of said roller to indicate the change of length of said sample as it becomes wetted.

IVOR M. COLBETH.